United States Patent [19]
Parkin

[11] 3,891,843

[45] June 24, 1975

[54] PHOTOSENSITIVE TRACKER INCLUDING MEANS FOR PRODUCING AN OUTPUT IN ACCORDANCE WITH A PLURALITY OF RADIATION CHARACTERISTICS

[75] Inventor: William J. Parkin, Natick, Mass.

[73] Assignee: Sanders Associates, Inc., South Nashua, N.H.

[22] Filed: Apr. 5, 1963

[21] Appl. No.: 272,181

[52] U.S. Cl.......... 250/203 R; 250/211 K; 250/338; 244/3.16
[51] Int. Cl............................................. G01j 1/20
[58] Field of Search............ 250/338, 203 R, 211 K; 244/14.3

[56] References Cited
UNITED STATES PATENTS

| | | | |
|---|---|---|---|
| 2,794,863 | 6/1957 | Roosbroeck | 250/211 |
| 2,861,262 | 11/1958 | Pankove | 250/211 |
| 2,906,916 | 9/1959 | Palmer | 250/203 X |
| 2,959,681 | 11/1960 | Noyce | 250/211 |
| 3,028,500 | 4/1962 | Hallmark | 250/203 |
| 3,112,399 | 11/1963 | Chew | 250/203 R |

*Primary Examiner*—Maynard R. Wilbur
*Assistant Examiner*—S. C. Buczinski
*Attorney, Agent, or Firm*—Louis Etlinger; Richard I. Seligman

EXEMPLARY CLAIM

11. Sensing apparatus, comprising:
radiation responsive, variable impedance detector means having an element adapted to vary in impedance in response to said radiation for continuously producing a position signal indicative of the position of said radiation relative to said element and in accordance with the variation of an internal element impedance with respect to another internal element impedance;
load impedance means coupled to said detector means for continuously developing an intensity signal, independently of said position signal, in accordance with the variation of the total impedance of said element with respect to said load impedance and indicative of the intensity of said radiation; and
output means coupled to said detector and load means for providing an output signal in accordance with selected characteristics of said radiation.

26 Claims, 12 Drawing Figures

PATENTED JUN 24 1975

3,891,843

SHEET 1

WILLIAM J. PARKIN
INVENTOR.

BY David A. Rick

ATTORNEY

WILLIAM J. PARKIN
INVENTOR.

BY David A. Rich

ATTORNEY

INVENTOR.
WILLIAM J. PARKIN
BY David A. Rich
ATTORNEY

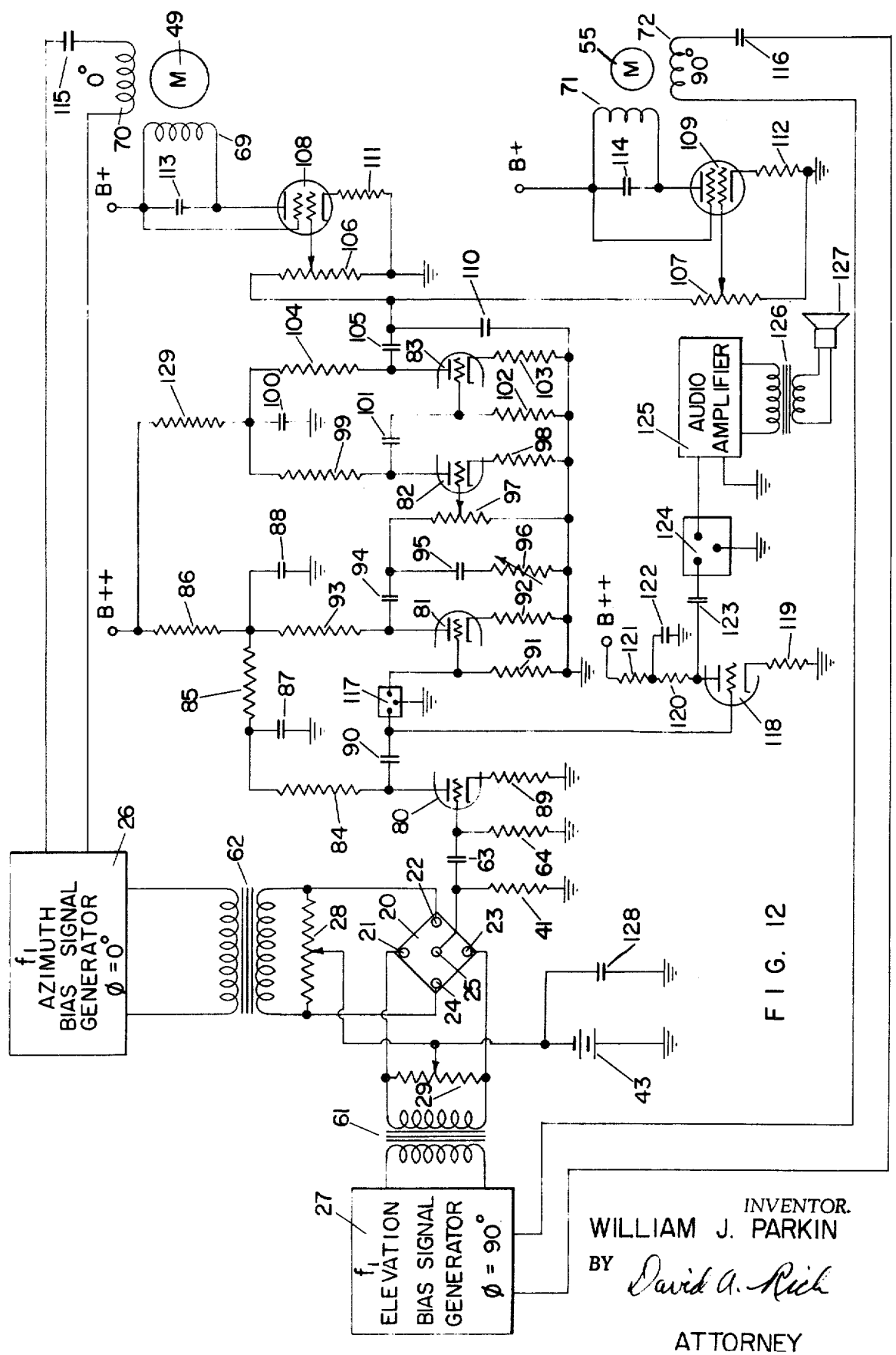

3,891,843

PHOTOSENSITIVE TRACKER INCLUDING MEANS FOR PRODUCING AN OUTPUT IN ACCORDANCE WITH A PLURALITY OF RADIATION CHARACTERISTICS

The present invention relates generally to radiation sensing apparatus and devices. More particularly, the invention relates to optical and near optical sensing apparatus and devices. More especially, the invention relates to infrared tracking apparatus and devices for detecting and tracking infrared signals.

This application presents an improvement relating to my copending applications entitled Radiant Energy Detector, Ser. No. 253,503, filed Jan. 23, 1963; and entitled Tracking System, Ser. No. 253,504, now U.S. Pat. No. 3,657,548 filed Jan. 23, 1963.

Detector elements which change electrical characteristics in response to radiation are broadly useful in the invention. Of particular use in the invention are detector elements having a variable impedance or resistivity, or conversely, conductivity, in response to radiation. The change in impedance may be due to the well-known photoelectric effect or to energy absorption in the atomic or quantum mechanical sense.

Photoelectric devices for sensing the presence of infrared energy are broadly classified photovoltaic and photoconductive. The photovoltaic infrared detectors produce a voltage in response to the presence of infrared. The photoconductive detectors provide a variable conductivity in response to the presence of infrared energy.

Radiation absorption materials of the type used for bolometers for radiation intensity measurements epitomize an absorption-type detector. Resistive material of this character is marketed under the name "Thermistor" by Barnes Engineering Company, Stamford, Conn.

Typical prior art circuits use a photoconductive infrared detector placed in series with a direct current bias source and a load impedance. The impingement of infrared energy upon the infrared detector cell has the effect of increasing its conductivity to produce a higher voltage across a load impedance. In effect, the cell and the load impedance provide a potentiometer to produce an output direct current signal which is a function of the amount of infrared energy impingent on the cell.

To provide an indication of the location of a target, prior art systems typically utilize a rotating vane or reticle which partially obscures the cell and rotates about the central axis of the cell. The system produces a null error signal when the target is precisely on boresight, that is, along the central axis of the optical cell and its associated optical system. The output voltage across the load impedance is a constant. While the target is located off the axis, the exposure of the cell to infrared energy varies with the position of the vane. In effect, the rotating vane provides a modulation which appears as an alternating current component across the load impedance. The amplitude of the modulating signal is a function of the degree of offset of the target from the boresight axis.

In an article entitled "Application of the Lateral Photoeffect to a Tracking System" by C. L. Patterson appearing in "Infrared Physics," 1962 volume 2, pages 75–85, Porganson Press, Ltd., Great Britain, the photovoltaic detector element utilizing the so-called lateral photoelectric effect is described. Physically, this system utilizes a photovoltaic detector cell with four terminals. The system, however, is completely distinguishable from the present invention in that it utilizes the photovoltaic effect, that is, it produces an output direct current in response to the impingement of infrared energy. A modulation signal is produced with the use of a rotating mechanical vane or reticle. The only real advantage of of this system is to provide two-dimensional information in the form of a pair of orthogonal signals in the output. The circuitry, however, is enormously complicated in order to provide the desired result.

In contrast, the sensing apparatus of the present invention provides two-dimensional information without any mechanical parts, and furthermore, uses the four terminal connections to the cell to introduce a pair of alternating current bias signals in phase quadrature. This concept is completely alien to the device disclosed by Patterson.

The expression "radiation responsive, variable impedance," as used herein, includes, but is not limited to, impedance changes due to electromagnetic radiation in its various forms impingent, e.g., upon a detector element. The terms thermoelectric, thermovoltaic, thermoconductive and thermosensitive, as used herein, are analogous to photoelectric, photovoltaic, photoconductive and photosensitive in that a variation in an electrical characteristic takes place in response to radiation of a thermal or optical character. Thermoconductive materials vary in impedance due to absorption of energy whatever the radiation frequency. Such materials, in the first order, vary in impedance with temperature. Since the temperature varies with radiation absorption, the impedance varies in response to radiation. While the invention is typically utilized in conjunction with optical and near optical frequencies, it will be apparent that many types of radiation are well within the scope of the inventions. Examples include electromagnetic particle radiation such as atomic and sub-atomic particles.

In my copending applications noted above, sensing apparatus and devices and tracking systems are disclosed which produce an output signal in accordance with the position of a radiation source. The present invention relates to an improvement directed to the production of an output signal in accordance with a plurality of radiation characteristics such as, e.g., intensity levels and amplitude modulation signals as well as position. Thus, a circuit embodying the invention tracks a source of radiation while simultaneously demodulating amplitude variations through a common aperture.

It is therefore an object of the invention to provide an improved tracking circuit for producing an indication of the presence and location of a remote source of radiation or target without mechanically moving parts while simultaneously producing indications of intensity variations.

A still further object of the invention is to provide an improved tracking circuit of the character described responsive to radiation through a common aperture.

Yet another object of the invention is to provide an improved tracking communicator circuit for receiving information bearing radiation through a common aperture and enabled to tracking the source of the information while simultaneously demodulating the information.

Still another object of the invention is to provide an improved tracking radiometer circuit capable of tracking a source of radiation while simultaneously producing indications of the intensity of the radiation.

A further object of the invention is to provide an improved sensing apparatus for producing in response to radiation a composite signal indicative of the presence of the radiation and indicative of a selected characteristic of the radiation.

In accordance with the invention there is provided a radiation sensing apparatus. The apparatus includes a radiation responsive variable impedance detector means. Primary biasing means are coupled to the detector means for coupling a primary bias signal therethrough. Secondary biasing means are coupled to the detector means for coupling a secondary bias signal therethrough. Output means are coupled to the detector means for providing an output signal according to a selected characteristic of the radiation.

In one form of the invention the detector means is adapted to vary in impedance in response to the radiation for producing a signal in accordance with the variation of the detector impedance with respect to another detector impedance. Load impedance means are coupled to the detector means for developing a signal in accordance with the variation of the detector impedance with respect to the load impedance. The output means are coupled to the detector and the load impedance means.

In another form of the invention the detector means has a detector element adapted to vary in impedance in response to radiation and having a plurality of input terminals and an output terminal. Secondary biasing means are coupled to the element and the load means for coupling a secondary bias signal through the load means and the element through all of the terminals.

In yet another form of the invention the primary biasing means couple through the element through the input terminals a pair of alternating current bias signals differing in phase.

In still another form of the invention a tracking circuit is provided. The tracking circuit includes a mount means having a movable member with two degrees of freedom. A radiation responsive, photosensitive, variable impedance detector element is carried by the member. The element has four input ohmic bias terminals arranged in a rhombic pattern and an output ohmic terminal centrally disposed with respect to the pattern. A reference phase bias signal transformer means has a secondary winding coupled to a pair of diagonally opposed input terminals for coupling the element to a source of alternating current reference phase bias signal. Reference phase balancing means are coupled to the reference bias transformer means with a potentiometer stator coupled in parallel with the secondary winding and having a variable potentiometer electrical connection for producing a variable reference bias signal relative to a reference voltage level.

A quadrature phase bias signal transformer means has a secondary winding coupled to the other pair of the input terminals for coupling the element to a source of alternating current quadrature phase bias signal in phase quadrature with the reference bias signal. Quadrature phase balancing means are coupled to a quadrature bias transformer means with a potentiometer stator coupled in parallel with the quadrature bias secondary winding. The quadrature balancing means has a variable potentiometer electrical connection connected in junction with the first potentiometer connection for producing a variable quadrature bias signal relative to the reference voltage level. Load impedance means are coupled to the element through the output terminal. Direct current biasing means are coupled in a direct current path through the terminals, the load impedance means and the phase bias signals, through the junction, for coupling a direct current bias signal therethrough. Output means are coupled to the element through the output terminal for providing vertical and horizontal drive control signals indicative of position of a remote radiation source and an output amplitude signal indicative of radiation amplitude variations. The phase bias and output signals are balanced with respect to reference level. Output means include vertical and horizontal position signal resolution means and radiation amplitude signal resolution means. Drive means are coupled to the output means and the mount means for controlling the orientation of the variable member in response to the drive control signals. In this manner the tracking circuit is enabled to receive communication signals from a remote source of amplitude modulated radiation and demodulate the communication signals while simultaneously and continuously aligning the detector element with the source.

In yet another form of the invention a tracking circuit is provided. In place of the direct current means a secondary alternating current bias signal means has a secondary winding coupled to the element for coupling therethrough a secondary alternating current bias signal differing in frequency from the phase bias signals. Secondary bias balancing means are coupled to the secondary bias transformer means with a potentiometer stator coupled in parallel with the secondary bias secondary winding. The secondary balancing means has a variable potentiometer electrical connection for producing a variable secondary bias signal relative to a second reference voltage level. The phase bias and drive signals are balanced with respect to the first reference level. The secondary bias and amplitude signals are balanced with respect to the second reference level. The output means include radiation intensity resolution means which provide an indication of radiation intensity only in response to the secondary bias signal frequency.

Other and further objects of the invention will be apparent from the following description of the invention taken in connection with the accompanying drawings and its scope will be pointed out in the appending claims.

In the Drawings:

FIG. 12 is a detailed schematic circuit diagram of the communicator circuit in FIG. 10.

PRINCIPLES OF OPERATION

Figure 1:
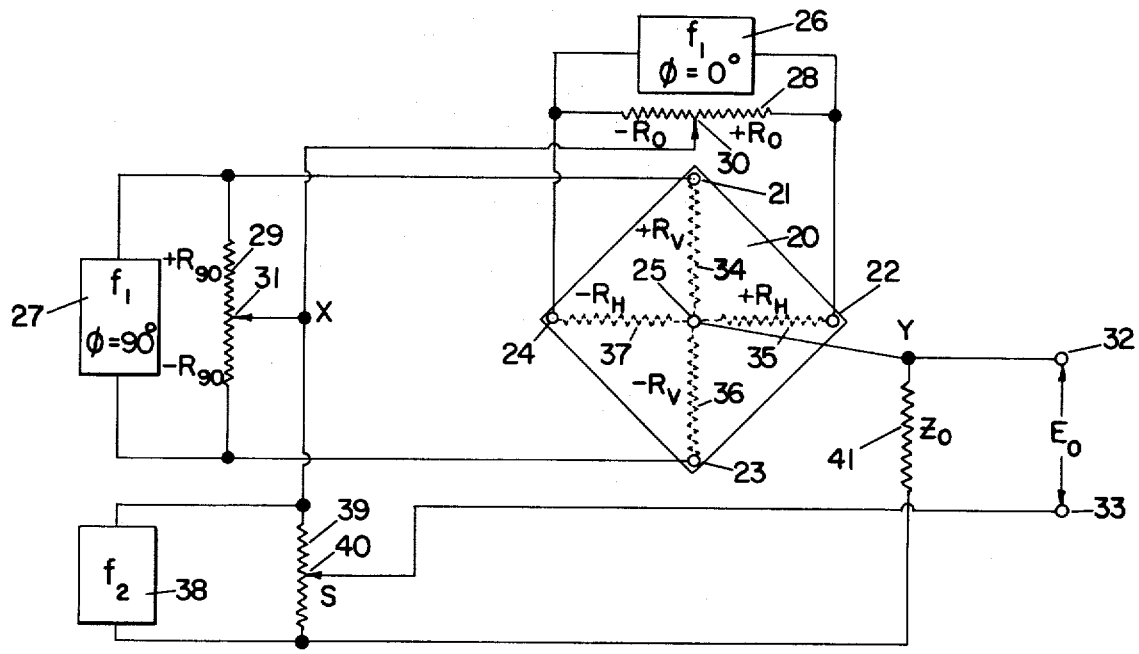
FIG. 1 is a schematic circuit diagram of a sensing apparatus embodying the principles of the invention.

In the conventional detection circuit, a photoconductive detector element, for example, a lead sulphide cell, forms part of a voltage divider. Modulated light impinging on the cell produces an electrical output. The voltage gradient across such a cell is linear and the equipotential potential lines, i.e., lines of equal voltages, are perpendicular to the direction of the current flow.

The sensing apparatus of the present invention as distinguished from the prior art provides in effect a rotating field detector. This result is obtained by introducing a pair of alternating current bias signals which are differing in phase and, preferably, phase in quadrature. By employing a cell having four ohmic terminals connected to the cell in a rhombic pattern, opposing pairs of terminals provide orthogonal axes. With an ohmic terminal disposed at the center of the rhombic pattern, an alternating signal applied to a pair of diagonally opposed colinear terminals produces zero output unless an impedance unbalance occurs between the central terminal and one of the opposed bias terminals. This result in effect produces an output error signal the amplitude of which provides the necessary information to determine the degree of offset or displacement of a source of radiation from the boresight or central axis of the cell. This, of course, is true for one of a pair of orthogonal axes. By introducing another alternating current across an axis physically orthogonal to the first axis as defined by the terminals, the information may be obtained for the other of a pair of orthogonal reference axes.

The effect of introducing a pair of quadrature phased bias alternating current signals to such a cell is to produce a rotating field. Because of the rotating field, a target image off the reference axes produces an error signal which varies in phase as well as amplitude. This phase variation enables the resolution from the resultant output error signal of orthogonal signal components, e.g., vertical and horizontal or azimuth and elevation.

The phase bias signals are preferably phased in quadrature for resolution with respect to orthogonal references axes. The phase bias signals may differ in phase any degree for use with corresponding reference axes. Orthogonal phased output error signals may be produced by introducing appropriate phase correction in the circuitry following the cell. Under dark current or uniform background illumination conditions the cell produces no signal output. When radiation is received along the boresight axis, no unbalance, and, hence, no output signal is produced. The apparatus thus fails to produce an output signal in response, for example, to radiation intensity or to amplitude modulated radiation.

The functional requirement on the system to produce an output signal in response to amplitude variations of radiation on boresight appears to be inconsistent with the requirement to produce no error signal output in response to radiation received on boresight. In terms of the cell, it would appear that it must be balanced to respond to radiation on boresight and unbalance to respond to variations in amplitude of radiation received on boresight.

This apparent paradox is overcome in the instant invention by introducing a secondary bias signal and external load impedance. The secondary bias signal is distinguishable from the phase bias signals, for example, by using direct current or a different frequency. For position error signal output, e.g., the system responds to a change in detector impedance with respect to itself. For variations in intensity of radiation received on boresight, e.g., the system responds to a change in detector impedance with respect to an external load impedance.

Figure 2:
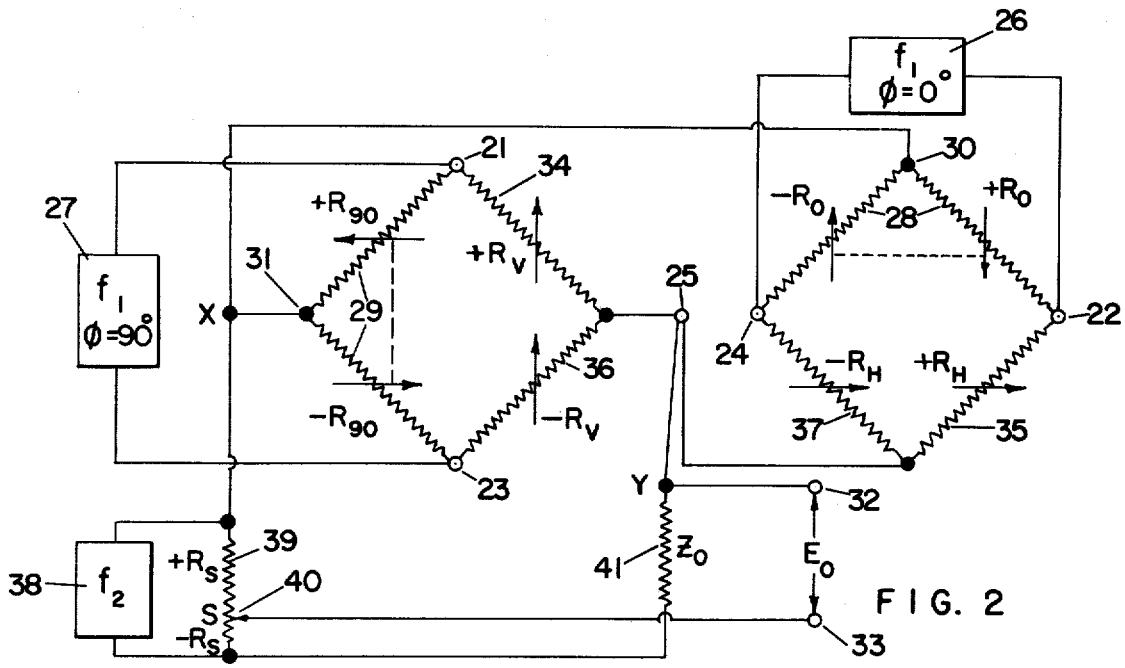
FIG. 2 is an equivalent circuit of the apparatus in FIG. 1.
Figure 3:
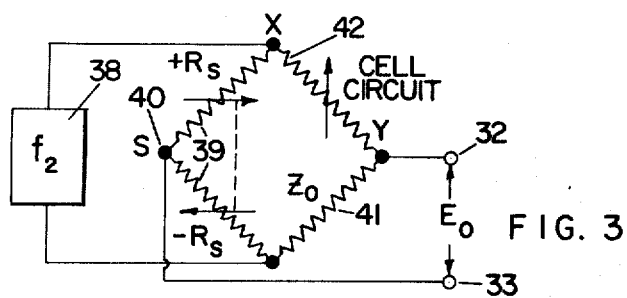
FIG. 3 is an equivalent circuit of the circuit in FIG. 2 with particular emphasis on the secondary bias.

Description and Explanation of the Sensing Circuit in FIGS. 1, 2 and 3.

Referring now to the drawings and with particular reference to FIG. 1, there is here illustrated a schematic circuit diagram of a sensing apparatus embodying the principles of the invention. Here a radiation responsive, variable impedance detector element, such as a photoconductive or thermoconductive element, provides the basic sensing element for the circuit. The element is shown coupled to a pair of alternating current primary bias signal generators of differing phase, here phase quadrature. Primary balancing means potentiometers are coupled in parallel with the bias generators. A secondary bias signal generator and an external load impedance are coupled between the primary bias signal generators and the detector element.

Thus a photoconductive detector element 20 having four input ohmic bias terminals 21–24, inclusive, disposed in a square, or more generally a rhombic, pattern and a centrally disposed, output ohmic terminal 25 provides the basic sensing element. Primary biasing means, for example, a horizontal bias signal generator and vertical bias signal generator, are each coupled to a pair of diagonally opposed input bias terminals. The horizontal and vertical generators correspond with generators 26 and 27 here designated as $f_1$, $\phi=0°$ and $f_1$, $\phi=90°$, respectively. The legend $f_1$ indicates a predetermined frequency and the legend $\phi$ indicates the relative phase of the bias signals. The generator 26 couples a reference or 0° phase bias signal to the diagonally opposed input bias terminals 22 and 24 of the element 20. The generator 27 couples a quadrature or 90° phase bias signal to the other two input bias terminals 21 and 23. The bias signals are thus in phase quadrature. A secondary biasing means, here a generator 38 designated $f_2$, is coupled to the element 20 through a load impedance means or resistor 41 to the element 20 through its output terminal 25.

A primary balancing means, here shown including potentiometer stators 28 and 29, are coupled respectively between the biasing means generators 26 and 27 and the element 20. The potentiometers or variable resistors have variable electrical connections 30 and 31 coupled respectively to the stators 28 and 29. The variable connections are joined at a junction indicated as X. The primary balancing means are thus coupled to the bias means between the element and the primary biasing means for each of the bias signals. The balancing means, hence, include a variable voltage control for each of the bias signals to produce a variable reference bias signal and an independently variable quadrature bias signal relative to a first reference voltage level to balance the phase bias and output signals with respect to the reference level.

A secondary balancing means includes a potentiometer stator 39 coupled in parallel with the secondary bias signal generator 38. The generator 38 and the stator 39 are connected to the junction X and, through the resistor 41, to a junction designated as Y connected to the detector terminal 25. The secondary potentiometer has a variable electrical connection 40 coupled to the stator 39 and connected to an output terminal 33. An output signal $E_o$ is developed between an output terminal 32 connected to the junction Y and the terminal 33.

The internal equivalent resistance of the detector element or photocell is indicated in dashed lines by the phantom lumped constant resistors 34–37 connected between the element output terminal 25 and the input bias terminals 21–24, respectively. The resistors 34–37 are also indicated as $\pm R_V$ and $\pm R_H$ as shown. The phantom resistors are helpful in describing a physical pair of orthogonal reference axes with respect to which the position of a point of received energy may be indicated.

Referring now to FIG. 2, the equivalent circuit of the circuit in FIG. 1 is illustrated. In FIGS. 1–8, like elements have like reference numerals. The circuit in FIG. 2 illustrates particularly the independence of control of the phase bias signal circuits with respect to the junctions X and Y. The effect of the secondary bias signal is particularly illustrated in FIG. 3 as will be described below. Here a pair of bridge circuits representing the equivalent resistances of the phase bias and detector element circuits illustrate the independence of control or adjustment of each of the phase bias signal circuits at the junction Y relative to the reference voltage level at the junction X.

The potentiometer stators 28 and 29 are shown with the elements $\pm R_0$ and $\pm R_{90}$ variable in an inversely coupled manner to correspond with the variation in resistance attributable to motion of the variable electrical connections 30 and 31 respectively. The resistors marked $\pm R_V$ and $\pm R_H$ are equivalent lumped constant resistors which vary in accordance with impingent radiant energy.

The secondary bias signal generator 38 marked $f_2$ is connected in parallel with the potentiometer 39. The generator 38 and potentiometer 39 are connected in series with the load impedance resistor 41 marked $Z_o$. The stator of the potentiometer has resistor sections marked $\pm R_s$ for reference in FIG. 3. The variable potentiometer electrical connection 40 provides a second reference voltage level indicated at S.

Referring now to FIG. 3, the equivalent circuit of the circuit in FIG. 2 is illustrated. Here a variable resistor 42 represents the entire bridge circuit between the points X and Y. The discussion which follows is with reference to FIGS. 2 and 3.

With no optical signal impingent on the photocell 20, that is, under dark current conditions, the output signal $E_o$ between the terminals 32 and 33 can be any predetermined amount. The signal represented by $E_o$ is a composite signal which includes both horizontal and vertical information, or, more generally, orthogonally resolvable phase components of frequency $f_1$ as well as a data bearing signal of frequency $f_2$. For the case wherein $f_2 = 0$ or direct current, the signal $f_1$ becomes data bearing by virtue of variations in a selected characteristic other than phase, e.g., in amplitude.

The system must be balanced for purposes of providing a position reference for impingent radiant energy with respect to which a position error signal is produced. This requirement is apparently incompatible with producing a signal in accordance with, e.g., variations in amplitude of impingent energy. The discussion which follows describes how the system is balanced for purposes of position error signals and unbalanced for amplitude variation signals.

In the simplest case the variable potentiometer electrical connection 31 may be varied to balance the vertical bias signal and output signal $E_o$ relative to the reference voltage leval at the point X to produce, for example, zero vertical voltage output therebetween. Similarly, the variable connection 30 may be adjusted to produce a zero horizontal voltage output between X and Y. In this manner the quadrature and output signals are balanced relative to the reference voltage level at the point X. Note that with respect to the point X the reference or horizontal bias signal can be adjusted independently from the quadrature or vertical bias signal.

Having balanced the bridge circuit between points X and Y, the secondary bias signal may be adjusted to produce a predetermined output signal $E_o$, e.g., of zero volts, between the terminals 32 and 33.

For the bridge circuit between X and Y, the dark current condition and uniform illumination at the cell 20 produces no unbalance, and, hence, no output position error component in the ouptut signal $E_o$. If the dark current condition is used as a standard, uniform illumination of the cell unbalances the circuit of FIG. 3 to produce an output data bearing signal component in the output signal $E_o$. Note that with respect to the point Y, the secondary bias signal $f_2$ may be adjusted independently of the phase bias signals $f_1$.

The bridge circuit as illustrated responds to an unbalance signal of some kind in order to produce an output position error signal component. The bridge circuit balance condition described above is determined for the purpose of producing an output signal in response to an unbalance of an impingent optical signal. A spot of light falling on the boresight axis illuminates the surrounding area uniformly and symmetrically to produce no unbalance. A spot of light falling between the terminals 25 and 21 along the vertical axis has the effect of reducing the resistance $+R_V$ to produce unbalance since the resistance $-R_V$ is unaffected.

Assume an input voltage, for example, of 100 volts appearing between the terminals 21 and 23, then the voltage potentials across the resistors $+R_V$, $+R_{80}$ and $-R_V$, $-R_{90}$ for a balanced condition will be equal and opposite with respect to the points X and Y. Assume instantaneous voltage polarities of negative or minus terminal 21 and positive or plus terminal 23. For the balanced condition, the potential across each resistor is 50 volts. Starting with Point Y, the voltage across the resistor $+R_V$ is equal and opposite to the voltage across the resistor $+R_{90}$. Similarly the voltage across the resistor $-R_V$ is equal and opposite to that across the resistor $-R_{90}$.

Now consider an unbalance between the phase bias voltages appearing across the resistors $\pm R_{90}$, for example, a voltage across $+R_{90}$ of 10 volts. Then the voltage across $-R_{90}$ is 90 volts. Starting from point Y the voltage across $\pm R_V$ is +50 volts added to the negative 10 volts across $+R_{90}$ to produce a voltage between X and Y of $+40$ volts. Going the other way from the point Y the voltage across $-R_{1'}$ is $-50$ volts in series with the $+90$ volts across $-R_{\phi_V}$ to produce again $+40$ volts. Note that the reference voltage level in this condition may be taken to be 40 volts. If the resistance $\pm R_{1'}$ were internally unbalanced correspondingly in the same proportion, 10 volts would appear across $R_{1'}$ and 90 volts across $-R_{1'}$ to produce zero volts between X and Y for no signal condition.

For the condition in which the voltages across $\pm R_{1'}$ are balanced, light impinging in the region between the terminal 25 and the terminal 21 along the vertical axis tends to decrease the resistance $+R_{1'}$. Assuming that the voltage across the resistor $+R_{1'}$ is $+40$ volts and across the resistor $-R_{1'}$ is $-60$ volts, the voltage between X and Y becomes 10 volts. It may seem that the vertical signal component in the output signal $E_o$ is a function of the variation in impedance in response to radiant energy of $+R_{1'}$ relative to $-R_{1'}$.

The resultant 10 volt output signal for an unbalance of 10 volts across $\pm R_{1'}$ with $\pm R_{90}$ balanced, may be determined by adding the voltages in a similar manner. The $+40$ volts across $+R_{1'}$ and the $-50$ volts across $R_{90}$ yield $-10$ volts output; the $-60$ volts across $-R_{1'}$ and the $+50$ volts across $R_{90}$ yield again $-10$ volts.

Noting that the phase bias signal $f_1$ is indeed a composite signal including both the vertical and horizontal complements, the above analysis is equally appropriate to the circuit associated with the reference or horizontal bias signal generator 26. Once the system is balanced as, for example, by a predetermined setting, the output signal between X and Y is a function of the unbalance impedance, e.g., due to the displacement of a light spot off the origin. Note that in the region between, but not including, the terminals 25 and 21 a light spot of given intensity may move up and down the axis and vary the output signal in accordance with the sensitivity curve of a given cell configuration. The circuit responds also to a variation of intensity at a given point. For a given intensity the output position error signal amplitude responds in accordance with displacement from the origin.

To illustrate the operation of the secondary bias signal, in FIG. 3 assume $f_2$ input of 100 volts between X and the junction $-R_s$, $Z_o$, with point X negative or minus instantaneous voltage polarity. The output signal $E_o$ appears between the points Y and S and at the output terminals 32 and 33.

Because the voltage across X and Y produced by phase bias signal $f_1$ is distinguishable from the secondary bias signal $f_2$, the circuit of FIG. 3 need be analyzed only with respect to $f_2$. The operation of the circuit in FIG. 3 is independent of the bridge circuit between X and Y with respect to adjustments in the bias signals $f_1$ and $f_2$.

For dark current condition, no radiation impingent on the cell, the $f_1$ voltage from X to Y is zero for a balanced condition. The voltage from Y to S may then be adjusted, e.g., to zero. Variations in intensity of impingent radiation produce correspondance impedance variations in resistor 42. Such variations unbalance the circuit in FIG. 3 to produce an output data bearing signal component in the output signal $E_o$.

Thus, for an input of 100 volts across stator 39, the voltages across $\pm R_s$ are 50 volts and the voltages across X–Y and $Z_o$ are 50 volts, assuming $Z_o$ is equal to the resistance of resistor 42. The voltage potentials across X–Y and $+R_s$ are equal and opposite; similarly across $Z_o$ and $-R_s$. The output signal $E_o$ is then zero.

With energy impingent on the cell along the boresight axis, no output is produced across X–Y. However, resistor 42 decreases in resistance and the bridge circuit impedance varies with respect to $Z_o$. If the voltage across X–Y decreases to 45 volts, the voltage across $Z_o$ increases to 55 volts. Tracing from point Y to point S, $+45$ volts across X–Y algebraically adds to $-50$ volts across $+R_s$ to produce $-5$ volts between Y and S. The $-55$ volts across $Z_o$ adds to the $+50$ volts across $-R_s$ to again produce $-5$ volts out. Thus an output signal component at $f_2$ is produced regardless of the relative position of a spot or point of radiation impingent on the cell.

If $Z_o$ differs in resistance from resistor 42, the potentiometer 39 may be adjusted by moving the variable connection 40 to balance the circuit and provide a secondary reference voltage level. If, under dark current condition, the voltage across X–Y were 45 volts and the voltage across $Z_o$ were 55 volts, the connection 40 is varied to provide equal and opposite voltages across $\pm R_s$, respectively, to produce an output zero volts.

It will be apparent from the description of FIG. 3 that the invention has application to a single dimension circuit.

By removing the connections from the $f_1$, $\phi=0°$ generator 26 to the input terminals 22 and 24, e.g., the circuit may be used for vertical error signals only.

Figure 4:
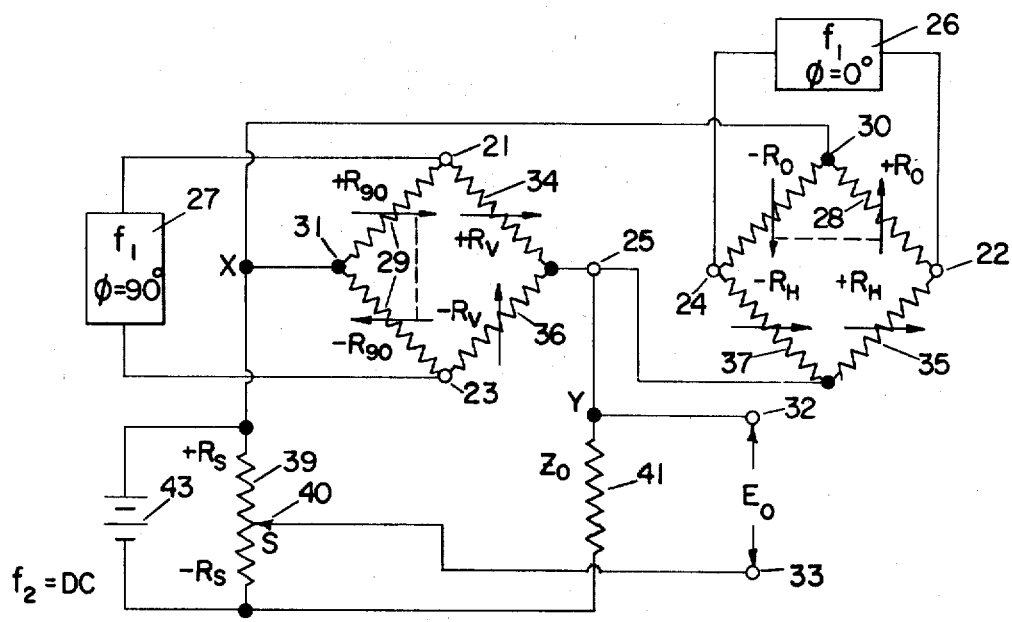
FIG. 4 is a modification of the circuit in FIG. 2 illustrating a modification of the apparatus in FIG. 1.
Figure 5:
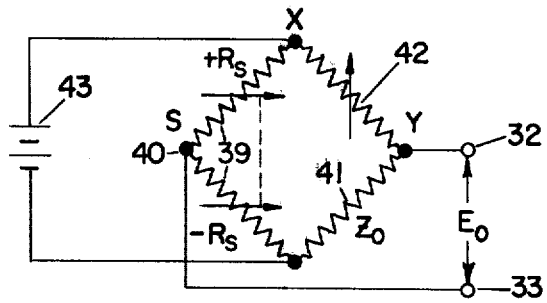
FIG. 5 is an equivalent circuit of the circuit in FIG. 4.

Description and Explanation of the Circuit in FIGS. 4 and 5

Referring now to FIGS. 4 and 5 there is here illustrated a modification of the circuit in FIG. 1. FIGS. 4 and 5 correspond, respectively, to FIGS. 2 and 3. Here the secondary bias signal generator 38 is replaced by a direct current source, a battery 43. This is equivalent to $f_2 = 0 = $ DC.

In this modification, the output voltage $E_o$ includes a direct current component. Amplitude variations of the $f_1$ signals have the effect of proportionately varying the DC output level. The output DC component varies as a function of impingent radiation in the manner described above in re the $f_2$ signal.

Figure 6:
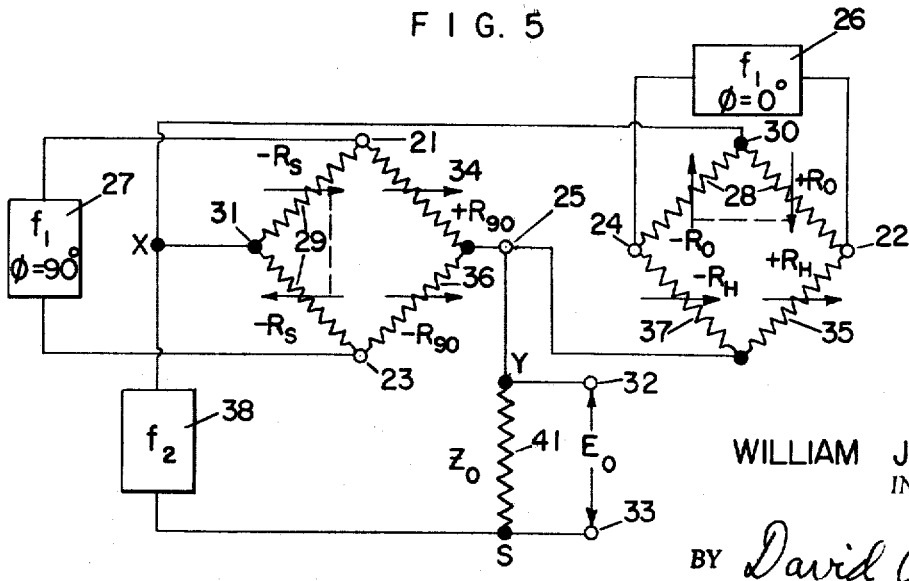
FIG. 6 is a modification of the circuit in FIG. 2 illustrating another modification of the apparatus in FIG. 1.
Figure 7:
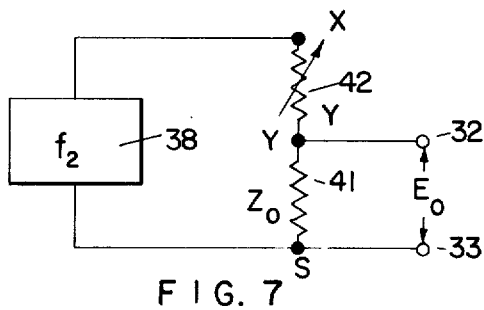
FIG. 7 is an equivalent circuit of the circuit in FIG. 6.

Description and Explanation of the Circuit in FIGS. 6 and 7

Referring now to FIGS. 6 and 7 there is here illustrated a further modification of the circuit in FIG. 1. FIGS. 6 and 7 correspond respectively to FIGS. 2 and 3. Here the secondary bias generator 38 is shown connected in series with the point X and the load impedance $Z_o$. As shown particularly in the equivalent circuit of FIG. 7, this modification effectively places the bridge circuit between X and Y in series with the load $Z_o$. The variations in impedance of the X–Y circuit produces an output data bearing signal component across $Z_o$.

Figure 8:
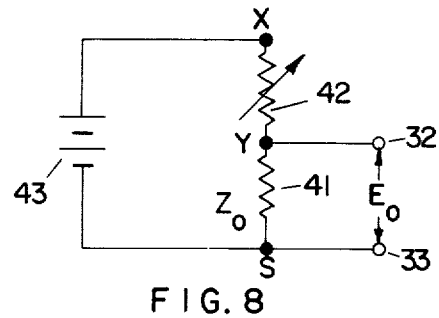
FIG. 8 is a modification of the circuit in FIG. 7 illustrating still another modification of the apparatus in FIG. 1.

Description and Explanation of the Circuit in FIG. 8

Referring now to FIG. 8, there is here illustrated a still further modification of the circuit in FIG. 1, in which, as shown in FIG. 7, $f_2 = 0 = $ DC. FIG. 8 corresponds with FIG. 7. The circuits of FIGS. 6–8 provide a fixed secondary bias signal voltage. To adjust the secondary voltage a variable impedance may be connected in series with the generator 38 or battery 43.

From FIGS. 7 and 8, it will be apparent that the system operates as a voltage divider or potentiometer comprising the bridge circuit X-Y and load impedance $Z_o$. As the X-Y circuit varies in impedance, the voltage across $Z_o$ varies accordingly to produce an output data bearing signal component distinct from position error information.

Note that the circuits illustrated in FIGS. 1-8 all have a DC path through all of the cell input terminals 21-24, the cell output terminal 25, and the load $Z_o$. In all cases the position error signal is produced by the variation of an internal cell resistance relative to another internal cell resistance. Further data bearing signals are produced by variations of overall cell impedance relative to an external load impedance $Z_o$.

Figure 9:
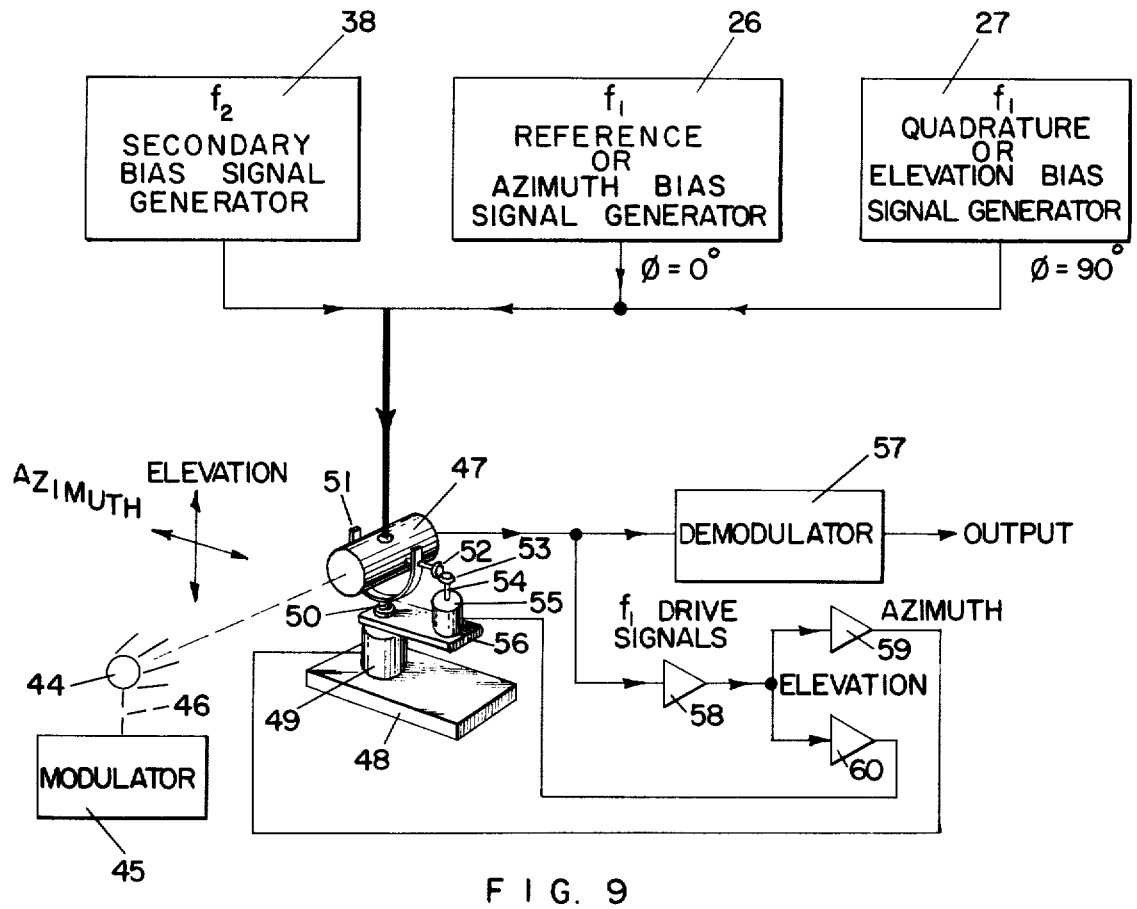
FIG. 9 is a partially schematic, perspective view of a tracking circuit embodying the invention.

Description and Explanation of the Circuit in FIG. 9

Referring now to FIG. 9, there is here illustrated a tracking circuit embodying the invention. A source 44 of radiation directs radiant energy to a detector element of the type shown in FIG. 1. The element is carried by a movable member 47 gimballed for motion in elevation and azimuth or vertical and horizontal, respectively. The intensity of radiation varies due to motion of the source 44, e.g., an aircraft, or modulation from a modulator 45 shown coupled to the source 44 by a dashed line 46. A mounting plate 48 carries an azimuth servo motor 49. The motor 49 is coupled to a rotatable shaft 50 of a gimbal yoke 51 which carries the member 47. The member 47 is rotatable about an axis perpendicular to the axis of the shaft 50. The yoke 51 is coupled to an elevation servo motor 55 which moves in azimuth with the yoke. A plate 56 carries the motor 55 and is attached to the yoke 51. The rotatable shaft of an elevation pinion gear 52 extends through bearing supports in the yoke 51 and is attached to the members 47. The gear 52 is coupled to a planar elevation drive gear 53 coupled through a rotatable shaft 54 to the elevation servo drive motor 55.

The member 47 carries a focusing optical system to capture the radiation and focus a convergent beam to provide a point or spot image on the detector element. For clarity the focusing system, load impedance and detector element are omitted from FIG. 9.

The detector element derives input phase bias signals from the generators 26 and 27. The phase signals have a designated frequency $f_1$ and are in phase quadrature. The reference or azimuth phase $\phi = 0°$ and the quadrature or elevation phase $\phi = 90°$. The element derives a secondary bias signal from the generator 38. The secondary signal has a frequency designated $f_2$ distinct from $f_1$. In one form of the invention $f_2 = 0 = DC$.

The $f_1$ drive signals are coupled to a drive signal amplifier circuit 58. The circuit 58 passes only $f_1$ signals and rejects substantially all other signals. It is coupled to a azimuth amplifier circuit 59 and, in parallel, to a separate elevation amplifier circuit 60. The azimuth amplifier 59 is coupled to the azimuth servo drive motor 49; the elevation amplifier 60, to the elevation motor 55.

A data bearing signal is coupled to a demodulator circuit 57 to provide an output signal representative, e.g., of audio communication or radiometer signals.

The tracking circuit is a null-seeking system which aligns the central axis of the member 47 with the boresight axis to the source 44. The tracking operates in response to position error signals derived from the azimuth and elevation circuits 59 and 60. The position error signals are produced, e.g., in the manner described in re FIGS. 1-8.

For an alternating current secondary bias signal of frequency $f_2 \neq f_1$, the demodulator circuit 57 rejects substantially all frequencies except $f_2$. In particular the circuit may include a rejection filter tuned to $f_1$. Additional rejection filtering of harmonics of $f_1$ may be required.

Figure 10:
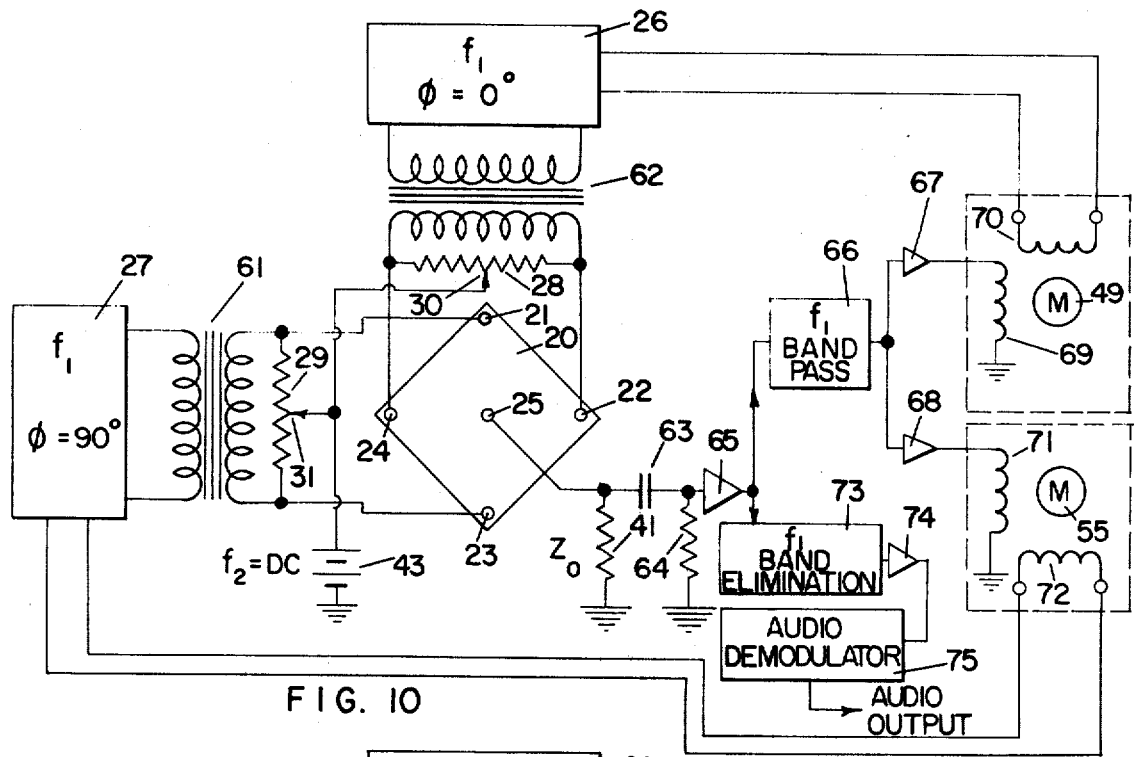
FIG. 10 is a schematic circuit diagram of a tracking communicator circuit embodying the invention.

Description and Explanation of the Tracking Circuit in FIG. 10

Referring now to FIG. 10, there is here illustrated a schematic circuit diagram of a target tracking communicator circuit embodying the invention. The tracking circuit includes a mounting means including a movable member with 2° of freedom to carry the detector element and its associated optical equipment. For purposes of clarity, the mount means, the movable member and the optical focusing means are not shown. Here again the element carries four input bias terminals arranged, for example, in a rhombic pattern and an output terminal centrally disposed with respect to the pattern. Primary biasing means are coupled to the element through the input terminals for providing a pair of alternating current bias signals through the element. The bias signals are in phase quadrature. Output means are coupled to the element through the output terminal for providing azimuth and elevation drive control signals indicative of position of a remote radiation source relative, for example, to the bore-sight axis of the element. Balancing means are coupled to the biasing means and the element for balancing the quadrature signals to provide a null reference. Drive means are coupled to the output means for controlling the orientation of the movable member in response to the drive control signals.

A secondary direct current bias signal and load impedance are coupled in series between the primary biasing means and the element through all of the terminals of the element. The output means includes means for demodulating amplitude modulation communications signals to provide an output communication signal while continuously tracking a remote source of modulated radiant energy.

The detector element circuit is based on the modification illustrated in FIG. 8 of the circuits shown in FIGS. 1, 6, 7, and 8. Here a pair of primary biasing signal transformers are coupled between the $f_1$ generators and the detector element input terminals. A direct current source is connected in series with the primary biasing circuit, the detector element and the load impedance $Z_0$ to provide a direct current secondary biasing signal.

The amplitude modulated radiant energy beam derived from a remote source is impingent on the cell. The null-seeking system operates to align the remote source along the boresight axis. Target tracking or position error signals are produced with respect to the $f_1$ primary biasing means. Variations in intensity, i.e., amplitude modulation or communication signals, are derived with respect to the $f_2 = DC$ secondary biasing means while the target or source is maintained on boresight. The tracking circuit is balanced with respect to position error signals. The circuit as a whole however, is unbalanced by variations in intensity of radiant energy at boresight as noted above in regard to FIGS. 1 – 8.

The tracking circuit is tuned to the primary bias signal frequency, $f_1$, and is coupled to a pair of servo motors which control the orientation of detector element. The audio communication signal is coupled through a primary signal $f_1$ rejection filter and demodulator to provide an output audio signal.

Thus, in FIG. 10, the element 20 has its input terminals 21 – 24 connected to the bias transformers 61 and 62.

A source of phase $\phi = 0°$ bias signal is derived from the $f_1$ azimuth bias signal generator 26 and phase $\phi = 90°$ from the elevation bias signal generator 27. The quadrature bias signals are coupled respectively to the primaries of the transformers 61 and 62. The secondary windings of the transformers 61 and 62 are connected to the respective terminal pairs 21, 23 and 22, 24. The output is coupled from the output terminal 25 to appear across the load impedance resistor 41 which is grounded on one side. The resistor 41 is coupled through a capacitor 63 to a grounded resistor 64 and to the input of an amplifier 65.

The output of the amplifier 65 is coupled through a band pass filter 66 to an elevation amplifier 67 and, in parallel, to an azimuth amplifier 68. The output of the amplifier 67 is coupled to a control winding 69 of the elevation drive motor 49. A reference winding 70 of the motor 49 is coupled back to the generator 26. The output of the amplifier 68 is coupled to a control winding 71 of the azimuth drive motor 55. The reference winding 72 of the motor 55 is coupled back to the generator 27.

The balancing potentiometers 28 and 29 are coupled in parallel respectively with the secondary windings of the transformers 62 and 61. The variable potentiometer electrical connections are connected to the direct current battery 43, which has one side grounded. The variable potentiometer electrical connections are electrically connected together and the output tracking signals appear across the resistor 41 with respect to a reference ground voltage potential.

In the tracking circuit as described, the detector element 20 is mounted on a movable member which is controlled in orientation by the drive motors 49 and 55. When light is impingent upon the cell 20 off its central axis, output tracking or position error signals are produced which are amplified at the amplifier 65 and applied through filter 66 and amplifiers 67 and 68 to the control windings of the motors 49 and 55. The motors are preferably dual phase induction motors. They operate on the principle of providing maximum rotation in a given direction when the phase of the energy on the control winding is 90° out of phase with the energy on the reference winding. Speed of rotation is a function of both the phase difference between the drive control signal on the control winding and the amplitude of the drive control signal. The direction of rotation is a function of the phase difference as well. For example, when the phase difference is −90°, the motor rotates in one direction and when the phase difference is +90°, the motor rotates in the opposite direction.

When an error signal is applied to the control windings, a correction is made by the drive motors, with respect to the elevation phase $\phi = 0°$, to reorient the cell along the boresight axis with respect to a source of radiation. This target tracking circuit is thus a null-seeking circuit.

Signal separation is preferably obtained by choosing one frequency $f_1$ to be above the highest audio frequency anticipated. The filter 66 may be selected, e.g., to pass 20 kilocycles ± 1 kilocycle and reject all other frequencies. Similarly the filter 73 may be selected to reject all frequencies above 10 kilocycles and operate as a low pass filter. If $f_1$ is chosen within the audio range, the filter 73 may be selected to reject $f_1$ frequencies only.

The audio signal is obtained by virtue of voltage variations across $Z_0$ taken with respect to an arbitrary steady state direct voltage at terminal 25 relative to ground. The capacitor 63 blocks DC and passes the audio signal component. The audio is passed by the amplifier 65, the filter 73, the amplifier 74 and demodulator 75 to provide an output audio signal.

With no external light or radiant energy impingent on the detector element 20, a maximum impedance appears across the cell and the voltage between the input terminals and the output terminal along orthogonal axes exactly balance with respect to the potentiometer connections 30 and 31 and, therefore, produce a tracking signal null. It is, of course, very difficult physically to introduce a center tap in the transformers or perfectly position the output terminal 20. In order to compensate for physical variations and the resultant electrical unbalance, a balancing circuit is required to provide a null reference.

As noted above, the balancing circuit operates to unbalance the bridge circuit impedance and provide a correction signal in opposition to the apparent physical displacement of the null. Thus, if, for example, with no light impingent on the cell or uniform illumination of the cell, if the indication is off the null in a vertical direction, this indicates the presence of an output signal of phase $\phi = 90°$. A balancing or compensating signal is introduced by varying the connection 31 of the potentiometer 29 essentially to provide a signal 180° out of phase with the unbalance signal to restore the null to the origin of, for example, a set of reference axes. More particularly, this is accomplished by varying the connection 31 until voltage between it and terminal 25 is a minimum. If there is a displacement of the null from the horizontal origin, the signal is obtained from the potentiometer 28 by varying its connection to counteract the horizontal unbalance and restore the apparent position of the null to the origin.

In operation, the cell is used in conjunction with an optical system which focuses, for example, a beam of infrared light to provide a spot of light impingent on the cell, the axis of the optical system being coincident with the boresight axis. With no light impingent on the cell, the quadrature phase bias signals, as noted above, produce a rotating field. Light precisely on the boresight axis is essentially impingent on the area surrounding the terminal 25 and produces no output tracing or position error signal. When the light spot is displaced from the center of the cell, a resultant tracking or position error signal is produced which provides an indication of the degree and direction of displacement of the spot from the center of the cell.

The variation of intensity symmetrically about terminal 25 varies the impedance of element 20 relative to the load impedance $Z_0$. This produces an audio signal component across $Z_0$, the resistor 41.

A cell useful in a system embodying the invention is typically formed in the following manner:

A blank of transparent supporting material provides a supporting plate. The plate, for example, may be 0.75 inches s square. The supporting plate is transparent to the radiant energy of interest. For infrared energy, a quartz plate is suitable. The plate may be, e.g., 0.04 inches thick. A layer of photoconductive material, for example, lead sulphide, is applied to the center area of the plate in the form, for example, of a square of the order of 0.22 inches per side. Within the corners of the square, gold contacts are evaporated onto the lead sulphide. Connection wires are connected to the gold contacts and extend at right angles from the surface. A potting compound is then applied to cover the lead sulphide surface area in order to provide a support for the contacts and sensitive material.

Figure 11:
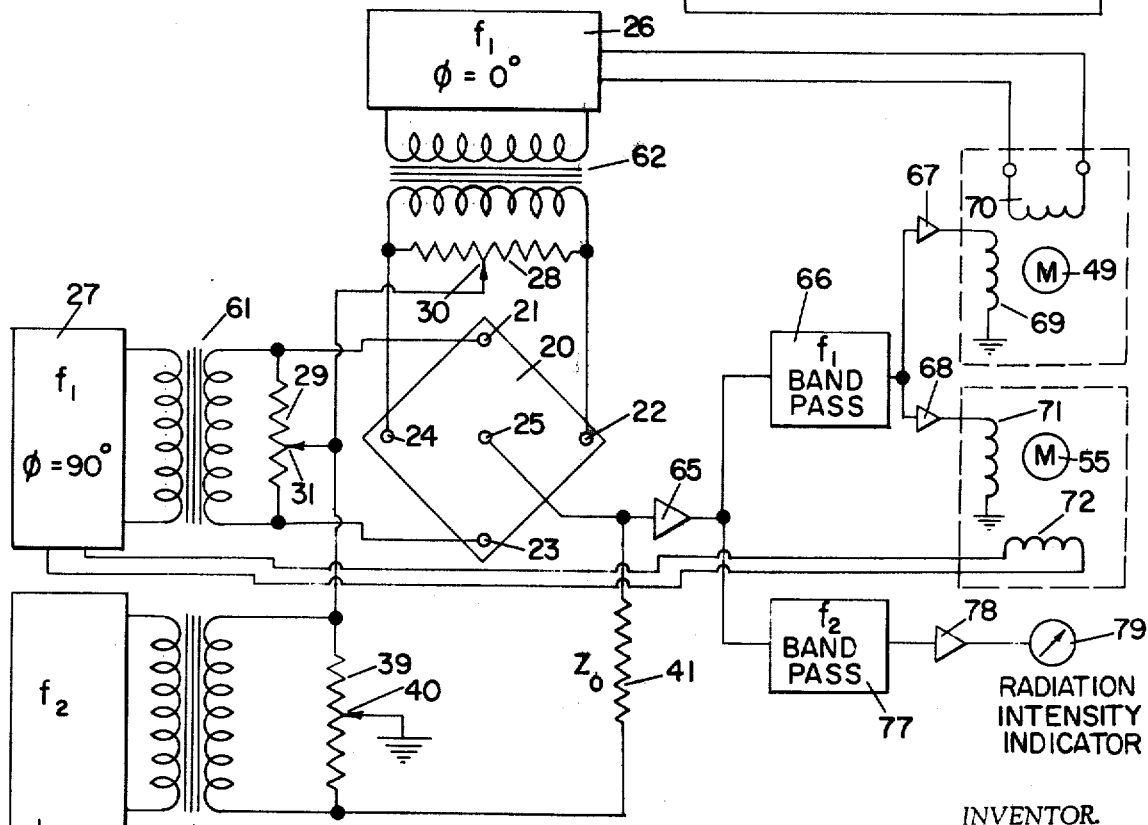
FIG. 11 is a schematic circuit diagram of a tracking radiometer circuit embodying the invention.

Description and Explanation of the Radiometer Circuit in FIG. 11

Referring now to FIG. 11, there is here illustrated a schematic circuit diagram of a tracking radiometer circuit embodying the invention. The circuit in FIG. 11 is the same as that in FIG. 10 except for the secondary biasing and radiometer circuits. The tracking circuit is identical in both Figures.

Here the secondary biasing signal $f_2$ is an alternating current supplied by the source 38. The source 38 is coupled to the primary winding of a secondary bias transformer 76. In parallel with the secondary winding of the transformer 76 is the secondary bias balancing potentiometer 39. The variable potentiometer connection 40 is grounded. The stator is connected in series with the load impedance $Z_0$ and the junction between the primary potentiometer connections 30 and 31.

The secondary bias signal $f_2$ is coupled through the amplifier 65 and band pass filter 77 to an amplifier 78 and meter 79. If the primary signal frequency $f_1$ is chosen to be /20 kilocycles, the secondary signal frequency $f_2$ is chosen to be separable, e.g., 1,000 cycles.

This circuit is balanced by adjustment, at dark current condition, of the potentiometers 28 and 29 to produce zero volts between terminal 25 and connection 31. Potentiometer 39 is then adjusted to produce zero volts between terminal 25 and ground.

When the target or remote radiation source is on boresight, the tracking circuit is, again, at null. The received radiant energy decreases the impedance of element 20 relative to $Z_0$, the resistor 41. A signal at frequency $f_2$ appears between terminal 25 and ground. The amplitude of this signal appears at meter 79 a measure of radiation intensity.

Description and Explanation of the Circuit in FIG. 12

Referring now to FIG. 12 there is here illustrated a detailed schematic circuit diagram of the tracking communicator circuit in FIG. 10. Like elements in FIGS. 10 and 12 here again have like reference numerals.

Here the detector element 20 and its associated bias and balance circuitry is shown coupled to a four-stage, resistance coupled tracking signal amplifier circuit associated with the triode tubes 80, 81, 82 and 83. The output of the four-stage amplifier is coupled through a power amplifier tetrode tube 108 to the azimuth drive motor 49, and, in parallel, to another power amplifier tetrode tube 109 which is coupled to the elevation drive motor 55.

The element 20 circuit is also coupled to an audio communication signal circuit channel associated with a triode 118, filter 124, amplifier 125 and speaker 127.

As noted above, the element 20 has its four input bias terminals 21 – 24 coupled to the secondaries of the bias transformers 61 and 62, as shown. Potentiometer stators 28 and 29 are coupled in parallel with the secondaries of the transformers 62 and 61, respectively. The variable electrical connections of potentiometers 28 and 29 are coupled together to the battery 43 to electrical ground potential. A capacitor 128 is coupled in parallel with the battery. The azimuth bias signal generator 26 provides a source of reference phase, $\phi = 0°$, bias signal coupled to the primary of the transformer 62 and the elevation bias signal generator 27 provides a source of quadrature phase, $\phi = 90°$, bias signal coupled to the primary of the transformer 61. The output terminal 25 of the element 20 is coupled to the load impedance resistor 41 which has one side grounded. The terminal 25 is coupled through the capacitor 63 to the grid load resistor 64 and directly to the control grid of the resistance coupled amplifier tube 80.

The plate of the triode 80 is coupled to the grid of the triode tube 81 through a filter 117. The output of the triode 81 is coupled to a phase compensation circuit and through a variable gain control to the grid of the triode 82; the plate of the triode 82 is in turn coupled to the grid of the triode 83. The plalte of the triode 83 is coupled to another phase compensator and through an azimuth variable gain control to the control grid of the azimuth drive control tetrode 108. Another output of the triode 83 is coupled, in parallel, through an elevation variable gain control to the control grid of the elevation drive control tetrode 109.

In detail, the plate of the triode 80 is connected to a plate load resistor 84 and through a pair of series connected voltage dropping resistors 85 and 86 to a source of high positive voltage labelled B++, e.g., 300 volts. The resistors 85 and 86 are bipassed to ground by capacitors 87 and 88 respectively. The cathode of the triode 80 is connected through a degenerative bias resistor 89 to ground. The output of the triode 80 is coupled through a capacitor 90 and filter 117 to a grounded grid resistor 91. The cathode of the triode 81 is connected through a bias resistor 92 to ground. The plate is connected through a plate load resistor 93 to the junction between the resistors 85 and 86.

The plate of the tube 81 is coupled through a capacitor 94 to a variable phase compensation circuit, a series connected capacitor 95 and grounded variable resistor 96. Capacitor 94 is connected, in parallel, to the variable gain control, a variable resistor 97, the variable connection of which is connected to the grid of the triode 82. The cathode of the triode 82 is connected through a bias resistor 98 to ground and the plate through a plate-load resistor 99 and voltage dropping resistor 129 to B++. A capacitor 100 is connected from the junction between the resistors 99 and 129 to ground.

The output of the triode 82 is coupled through a capacitor 101 to the grid of triode 83, which is coupled through a resistor 102 to ground. The cathode of the triode 83 is coupled through a bias resistor 103 to ground, and the plate through a plate load resistor 104 to the resistor 129. The plate of the triode 83 is coupled through a capacitor 105 to phase compensation capacitor 110 to ground.

The output of the triode 83 is coupled through the capacitor 105 to the grounded azimuth variable resistor 106 and, in parallel to the elevation amplitude control variable resistor 107. The variable electrical connections of the resistors 106 and 107 are connected, respectively, to the control grids of tetrodes 108 and 109. The screen grids are connected to a source of low positive voltage labelled B+, e.g., 125 volts. The plates are connected to the control windings 69 and 71 of the azimuth and elevation motors 49 and 55, respectively. The cathodes are coupled through bias resistors 111 and 112 to ground. The windings 69 and 71 have capacitors 113 and 114 connected in parallel. The reference winding 70 of the azimuth drive motor 49 is coupled through a capacitor 115 to the azimuth bias signal generator 26. The reference winding 72 is coupled through a capacitor 116 to the elevation bias signal generator 27.

The filter 117 is of conventional design to pass only signals of frequency $f_1$. The filter may be of conventional so-called high pass design or may be timed to pass on $f_1 \pm \Delta f$, for tracking purposes.

As noted above, the drive motors 49 and 55 are mechanically coupled to the mounting means for the element 20 to orient the boresight axis in accordance with the position of a remote radiation source. The phase compensation resistor 96 is varied to compensate for phase shift caused by the electrical circuitry. The phase adjustment is in addition to the fixed compensation provided by capacitor 110. The overall gain of the system is adjusted by the variable resistor 97. Independent amplitude adjustments for the azimuth and elevation drive control signals are provided by the variable resistors 106 and 107, respectively. The circuit in FIG. 12 may be modified by eliminating the power amplifiers and substituting phase sensitive rectifiers coupled to the vertical and horizontal terminals of cathode ray tube oscilloscope to provide a spot position indicator. The communication channel may then still be used.

An output from capacitor 90 is coupled to the grid of triode 118. The DC ground return is through the filter 117. Cathode bias is provided by a resistor 119 and the plate is connected to B++ through series-connected resistors 120 and 121. Resistor 120 is bipassed to ground by capacitor 122. The plate is coupled through capacitor 123 to a rejection filter 124 which bipasses the primary bias signal $f_1$ to ground and accepts only audio. Filter 124 may be a low pass filter to pass audio and reject $f_1$ for a suitable choice of $f_1$ signal frequency. The filter 124 is coupled through a conventional audio amplifier 125 and output transformer 126 to a speaker 127.

The primary bias frequency $f_1$ may be 400 cycles, and the voltage inputs to the transformers 61 and 62 and motor windings 70 and 72 110 volts. Values for other components may be chosen as follows:

| | | | |
|---|---|---|---|
| Triodes | 80, 81 | 12AX7 | |
| Triodes | 82, 83 | 12AU7 | |
| Tetrodes | 108, 109 | 6AQ5 | |
| Resistors | 28, 29 | 50.00 | Kilohms |
| Resistors | 96 | 100.00 | Kilohms |
| Resistors | 106, 107, 97 | 500.00 | Kilohms |
| Resistors | 89, 92, 98, 119 | 2.20 | Kilohms |
| Resistor | 103 | 1.30 | Kilohms |
| Resistors | 84, 93, 99, 120 | 270.00 | Kilohms |
| Resistor | 104 | 68.00 | Kilohms |
| Resistors | 85, 121, 129 | 20.00 | Kilohms |
| Resistor | 86 | 25.00 | Kilohms |
| Resistors | 111, 112 | 240.00 | ohms |
| Resistor | 102 | 70.00 | Kilohms |
| Resistor | 91 | 470.00 | Kilohms |
| Capacitors | 90, 94, 101, 105, 110, 123 | 0.01 | microforads |
| Capacitors | 87, 88, 100, 122 | 16.00 | microforads |
| Capacitor | 95 | 0.025 | microforads |
| Capacitors | 113, 114 | 0.60 | micorforads |
| Capacitors | 115, 116 | 0.30 | microforads |
| Motors | 49, 55 | 2 phase, 110 v. 400 cycles induction | |

The specifications and values above indicated are intended to be representative only and limited to a particular embodiment built and tested. It will be apparent that a wide range of components, voltages, frequencies and circuit parameters may be utilized within the scope of the invention.

From the foregoing discussion, it will be apparent that the invention has broad application in the fields of optical sensing and tracking devices and apparatus. The system is applicable for tracking communication between moving objects such as land, sea, air and space vehicles. As a tracking radiometer, the temperature of moving objects can be continuously monitored.

While there has hereinbefore been presented what at present are considered to be the preferred embodiments of the invention, it will be apparent to those of ordinary skill in the art that many modifications and changes may be thereto made without departing from the true spirit and scope of the invention.

It will be considered, therefore, that all those changes and modifications which fall fairly within the scope of the invention shall be a part of the invention.

What is claimed is:

1. Sensing apparatus, comprising:
   a radiation responsive, variable impedance detector element, said element having four input ohmic bias terminals arranged in a rhombic pattern and an output ohmic terminal centrally disposed with respect to said pattern;
   primary biasing means coupled to said element through said input terminals for coupling a pair of alternating current bias signals through said element, said bias signals being in phase quadrature and each bias signal being coupled through a pair of diagonally opposed input terminals;
   load impedance means coupled to said element through said output terminal;
   secondary biasing means coupled to said element through all of said terminals, said primary biasing and said load impedance means for coupling a secondary bias signal therethrough;
   output means coupled to said element through said output terminal for providing an output signal indicative of position of a remote radiation source and indicative of radiation amplitude variations, said output means including vertical and horizontal position resolution means; and
   balancing means coupled to said biasing means between said element and said biasing means for each said bias signal and including a variable voltage control for producing a variable reference voltage level to balance said bias and output signals with respect to saiad reference level.

2. Sensing apparatus, comprising:
   a radiation responsive, variable impedance detector element, having four input bias terminals and a centrally disposed, output terminal;
   reference phase biasing transformer means having a secondary winding coupled to a pair of said input terminals for coupling said element to a source of alternating current reference phase bias signal;

quadrature phase bias signal transformer means having a secondary winding coupled to the other pair of said input terminals for coupling said element to a source of alternating current quadrature phase bias signal in phase quadrature with said reference bias signal;

load impedance means coupled to said element through said output terminal;

secondary biasing means coupled to said element through all of said terminals, said primary biasing and said load impedance means for coupling a secondary bias signal therethrough;

output means coupled to said element through said output terminal for providing an output signal indicative of position of a remote radiation source and indicative of radiation amplitude variations; and balancing means coupled to said biasing means between said element and said biasing means for each said bias signal and including a variable voltage control for producing a variable reference voltage level to balance said bias and output signals with respect to said reference level.

3. Sensing apparatus, comprising:

a radiation responsive, variable impedance detector element, having four input bias terminals and a centrally disposed, output terminal;

reference phase biasing transformer means having a secondary winding coupled to a pair of diagonally opposed said input terminals for coupling said element to a source of alternating current reference bias signal;

reference phase balancing means coupled in parallel with said secondary winding and including a variable voltage control for producing a variable reference voltage level;

quadrature phase bias signal transformer means having a secondary winding coupled to a pair of said input terminals for coupling said element to a source of alternating current quadrature phase bias signal in quadrature with said reference bias signal;

quadrature phase balancing means coupled in parallel with said quadrature bias secondary winding and including a variable voltage control for producing a variable reference voltage level;

load impedance means coupled to said element through said output terminal;

secondary biasing means coupled to said element through all of said terminals, said primary biasing and said load impedance means for coupling a secondary bias signal therethrough; and output means coupled to said element through said output terminal for providing an output signal indicative of position of a remote radiation source and indicative of radiation amplitude variations, said bias and output signals being balanced with respect to said reference level.

4. Sensing apparatus, comprising:

a radiation responsive, variable impedance detector element, having four input bias terminals and a centrally disposed, output terminal;

reference phase biasing tramsformer means having a secondary winding coupled to a pair of diametrically opposed said input terminals for coupling said element to a source of alternating current reference phase bias signal;

reference phase balancing means coupled to said biasing transformer means with a potentiometer stator coupled in parallel with said secondary winding and having a variable potentiometer electrical connection for producing a variable reference voltage level;

quadrature phase bias signal transformer means having a secondary winding coupled to a pair of said input terminals for coupling said element to a source of alternating current quadrature phase bias signal in quadrature with said reference bias signal;

quadrature phase balancing means coupled to said quadrature biasing transformer means with a potentiometer stator coupled in parallel with said quadrature bias secondary winding and having a variable potentiometer electrical connection connected in junction with the first said potentiometer connection for producing a variable reference voltage level;

load impedance means coupled to said element through said output terminal;

secondary biasing means coupled in a direct current path to said element, through said terminals, said load means and said bias signals in phase quadrature through said junction for coupling a secondary bias signal therethrough; and output means coupled to said element through said output terminal for providing an output signal indicative of position of a remote radiation source and indicative of radiation amplitude variations, said bias and output signals being balanced with respect to said reference level.

5. Sensing apparatus, comprising:

a radiation responsive, photoconductive detector element, said element having four input ohmic bias terminals arranged in a rhombic pattern and an output ohmic terminal centrally disposed with respect to said pattern;

reference phase bias signal transformer means having a secondary winding coupled to a pair of said input terminals for coupling said element to a source of alternating current reference phase bias signal;

reference phase balancing means coupled to said reference bias transformer means with a potentiometer stator coupled in parallel with said secondary winding and having a variable potentiometer electrical connection for producing a variable reference voltage level;

quadrature phase bias signal transformer means having a secondary winding coupled to a pair of said input terminals for coupling said element to a source of alternating current quadrature phase bias signal in phase quadrature with said reference bias signal;

quadrature phase balancing means coupled to said quadrature phase bias transformer means with a potentiometer stator coupled in parallel with said quadrature bias secondary winding and having a variable potentiometer electrical connection connected in junction with first said potentiometer connection for producing a variable reference voltage level;

load impedance means coupled to said element through said output terminal;

secondary biasing means coupled in a direct current path to said element through said terminals, said load impedance means and said bias signals in phase quadrature through said junction for coupling a secondary bias signal therethrough; and output means coupled to said element through said output terminal for providing output signals indicative of position of a remote radiation source and indicative of radiation amplitude variations, said bias and output signals being balanced with respect to said reference level, said output means including vertical and horizontal position spiral resolution means and radiation amplitude signal resolution means.

6. Sensing apparatus, comprising:

a radiation responsive, photoconductive detector element, said element having four input ohmic bias terminals arranged in a rhombic pattern and an output ohmic terminal centrally disposed with respect to said pattern;

reference phase bias signal transformer means having a secondary winding coupled to a pair of said input terminals for coupling said element to a source of alternating current reference phase bias signal;

reference phase balancing means coupled to said reference bias transformer means with a potentiometer stator coupled in parallel with said secondary winding and having a variable potentiometer electrical connection for producing a variable reference voltage level;

quadrature phase bias signal transformer means having a secondary winding coupled to a pair of said input terminals for coupling said element to a source of alternating current quadrature phase bias signal in phase quadrature with said reference bias signal;

quadrature phase balancing means coupled to said quadrature phase bias transformer means with a potentiometer stator coupled in parallel with said quadrature bias secondary winding and having a variable potentiometer electrical connection connected in junction with the first said potentiometer connection for producing a variable reference voltage level;

load impedance means coupled to said element through said output terminal; means having a secondary winding coupled to said element through said terminals, said load impedance and said phase bias signals through said junction for coupling therethough a secondary alternating current bias signal differing in frequency from said phase bias signals;

secondary bias balancing means coupled to said secondary bias transformer means with a potentiometer stator coupled in parallel with said secondary bias secondary winding and having a variable potentiometer electrical connection for producing a secondary reference voltage level; and output means coupled to said element through said output terminal for providing output signals indicative of position of a remote radiation source and indicative of radiation amplitude variations, said phase bias and output signals being balanced with respect to the first said reference level and said secondary bias and said output signals being balanced with respect to said secondary reference level, said output means including vertical and horizontal position signal resolution means and radiation amplitude signal resolution means.

7. Sensing apparatus, comprising:

a radiation responsive, photoconductive detector element, said element having four input ohmic bias terminals arranged in a rhombic pattern and an output ohmic terminal centrally disposed with respect to said pattern;

reference phase bias signal transformer means having a secondary winding coupled to a pair of said input terminals for coupling said element to a source of alternating current reference phase bias signal;

reference phase balancing means coupled to said reference bias transformer means with a potentiometer stator coupled in parallel with said secondary winding and having a variable potentiometer electrical connection for producing a variable reference voltage level;

quadrature phase bias signal transformer means having a secondary winding coupled to a pair of said input terminals for coupling said element to a source of alternating current quadrature phase bias signal in phase quadrature with said reference bias signal;

quadrature phase balancing means coupled to said quadrature phase bias transformer means with a potentiometer stator coupled in parallel with said quadrature bias secondary winding and having a variable potentiometer electrical connection connected in junction with the first said potentiometer connection for producing a variable reference voltage level;

load impedance means coupled to said element through said output terminal;

direct current biasing means coupled in a direct current path to said element through said terminals, said load impedance means and said phase bias signals through said junction for coupling a direct current bias signal therethrough; and output means coupled to said element through said output terminal for providing output signals indicative of position of a remote radiation source andc indicative of radiation amplitude variations, said bias and output signals being balanced with respect to said reference level, said output means including vertical and horizontal position signal resolution and radiation amplitude signal resolution means.

8. Sensing apparatus, comprising:

a radiation responsive, photoconductive detector element, said element having four input ohmic bias terminals arranged in a rhombic pattern and an output ohmic terminal centrally disposed with respect to said pattern;

reference phase bias signal transformer means having a secondary winding coupled to a pair of said input terminals for coupling said element to a source of alternating current reference phase bias signal;

reference phase balancing means coupled to said reference bias transformer means with a potentiometer stator coupled in parallel with said secondary winding and having a variable potentiometer electrical connection for producing a variable reference voltage level;

quadrature phase bias signal transformer means having a secondary winding coupled to a pair of said input terminals for coupling said element to a source of alternating current quadrature phase bias signal in phase quadrature with said reference bias signal;

quadrature phase balancing means coupled to said quadrature phase bias transformer means with a potentiometer stator coupled in parallel with said quadrature bias secondary winding and having a variable potentiometer electrical connection connected in junction with the first said potentiometer connection for producing a variable reference voltage level;

load impedance means coupled to said element through said output terminal;

direct current bias signal means coupled to said element through said terminals, said load impedance means and said phase bias signals through said junction for coupling a direct current bias signal therethrough;

direct current bias balancing means coupled to said direct current bias means with a potentiometer stator coupled in parallel therewith and having a variable potentiometer electrical connection for producing a direct current reference voltage level; and output means coupled to said element through said output terminal for providing output signals indicative of position of a remote radiation source and indicative of radiation amplitude variations, said phase bias and output signals being balanced with respect to the first said reference level and said direct current bias and said output signals being balanced with respect to said secondary reference level, said output means including vertical and horizontal position signal resolutions means and radiation amplitude signal resolution means.

9. A tracking device, comprising:

mount means including a movable member with two degrees of freedom;

a radiation responsive, photosensitive, variable impedance detector element carried by said member, said element having four input ohmic bias terminals arranged in a rhombic pattern and an output ohmic terminal centrally disposed with respect to said patttern;

reference phase bias signal transformer means having a secondary winding coupled to a pair of diagonally opposed said input terminals for coupling said element to a source of alternating current reference phase bias signal;

reference phase balancing means coupled to said reference bias transformer means with a potentiometer stator coupled in parallel with said secondary winding and having a variable potentiometer electrical connection for producing a variable reference bias signal relative to a reference voltage level;

quadrature phase bias signal transformer means having a secondary winding coupled to the other pair of said input terminals for coupling said element to a source of alternating current quadrature phase bias signal in phase quadrature with said reference bias signal;

quadrature phase balancing means coupled to said quadrature bias transformer means with a potentiometer stator coupled in parallel with said quadrature bias secondary winding and having a variable potentiometer electrical connection connected in junction with the first said potentiometer connection for producing a variable quadrature bias signal relative to said reference voltage level;

load impedance means coupled to said element through said output terminal;

direct current biasing means coupled in a direct current path to said element through said terminals, said load impedance means and said phase bias signals through said junction for coupling a direct current bias signal therethrough;

output means coupled to said element through said output terminal for providing vertical and horizontal drive control signals indicative of position of a remote radiation source and indicative of radiation amplitude variations, said phase bias and output signals being balanced with respect to said reference level, said output means including vertical and horizontal position signal resolution means and radiation amplitude signal resolution means; and drive means coupled to said output means and said mount means for controlling the orientation of said movable member in response to said drive control signals, whereby said tracking device is enabled to receive communication signals from a remote source of amplitude modulated radiation and demodulate said communication signals while simultaneously and continuously aligning said detector element with said source.

10. A tracking device, comprising:

mount means including a movable member with two degrees of freedom;

a radiation responsive, photosensitive, variable impedance detector element carried by said member, said element having four input ohmic bias terminals arranged in a rhombic pattern and an output ohmic terminal centrally disposed with respect to said pattern;

reference phase bias signal transformer means having a secondary winding coupled to a pair of diagonally opposed said input terminals for coupling said element to a source of alternating current reference phase bias signal;

reference phase balancing means coupled to said reference bias transformer means with a potentiometer stator coupled in parallel with said secondary winding and having a variable potentiometer electrical connection for producing a variable reference bias signal relative to a first reference voltage level;

quadrature phase bias signal transformer means having a secondary winding coupled to the other pair of said input terminals for coupling said element to a source of alternating current quadrature phase bias signal in phase quadrature with said reference bias signal;

quadrature phase balancing means coupled to said quadrature bias transformer means with a potentiometer stator coupled in parallel with said quadrature bias secondary winding and having a variable potentiometer electrical connection connected in junction with the first said potentiometer connection for producing a variable quadrature bias signal relative to said reference voltage level;

load impedance means coupled to said element through said output terminal;

secondary alternating current bias signal means having a secondary winding coupled to said element through said terminals, said load impedance means and said phase bias signals through said junction for coupling therethrough a secondary alternating current bias signal differing in frequency from said phase bias signals;

secondary bias balancing means coupled to said secondary bias transformer means with a potentiometer stator coupled in parallel with said secondary bias secondary winding and having a variable potentiometer electrical connection for producing a variable secondary bias signal relative to a second reference voltage level;

output means coupled to said element through said output terminal for providing vertical and horizontal drive control signals indicative of position of a remote radiation source and indicative of intensity of said radiation;

said phase bias and output signals being balanced with respect to said first reference level and said secondary bias and output signals being balanced with respect to said second reference level, said output means including vertical and horizontal position signal resolution means and radiation intensity resolution means; and drive means coupled to said output means and said mount means for controlling the orientation of said movable member in response to said drive control signals, whereby said tracking device is enabled to receive communication signals from a remote source of radiation and produce an indication of intensity of said radiation while simultaneously and continuously aligning said detector element with said source.

11. Sensing apparatus, comprising:

radiation responsive, variable impedance detector means having a detector element adapted to vary in impedance in response to said radiation for producing a signal in accordance with the variation of one said detector element impedance with respect to another said detector element impedance;

alternating current primary biasing means coupled to said detector means for coupling a primary frequency bias signal through said element;

load impedance means coupled to said detector means for developing a signal in accordance with the variation of one said detector element impedance with respect to said load impedance;

alternating current secondary biasing means coupled to said detector means for coupling a secondary frequency bias signal differing from said primary frequency through said load impedance and said element; and output means coupled to said detector and load means for providing an output signal in accordance with a selected characteristic of said radiation.

12. Sensing apparatus, comprising:

radiation responsive, variable impedance detector means having a detector element adapted to vary in impedance in response to said radiation for producing a signal in accordance with the variation of one said detector element impedance with respect to another said detector element impedance, said element having four input ohmic terminals arranged in a rhombic pattern and a centrally disposed output terminal;

primary frequency biasing means coupled to said detector means for coupling a pair of quadrature phased, alternating current bias signals through said element through said input terminals;

load impedance means coupled to said detector means for developing a signal in accordance with the variation of one said detector element impedance with respect to said load impedance;

secondary biasing means coupled to said element and said load means for coupling a secondary frequency, alternating current bias signal differing from said primary frequency through said load means and said element through all of said terminals; and output means coupled to said detector and load means for providing an output signal in accordance with a selected characteristic of said radiation.

13. Sensing apparatus, comprising:

radiation responsive, variable impedance detector means having a detector element adapted to vary in impedance in response to said radiation for producing a signal in accordance with the variation of one said detector element impedance with respect to another said detector element impedance, said element having a plurality of input terminals and an output terminal;

primary biasing means coupled to said detector means for coupling a bias signal through said element through said input terminals;

load impedance means coupled to said detector means for developing a signal in accordance with the variation of one said detector element impedance with respect to said load impedance;

secondary biasing means coupled to said element and said load means for coupling a secondary bias signal along a nonrectifying direct current path through said load means and said element through all of said terminals; and output means coupled to said detector and load means for providing an output signal in accordance with a selected characteristic of siad radiation.

14. Sensing apparatus, comprising:

radiation responsive, variable impedance detector means having a detector element adapted to vary in impedance in response to said radiation for producing a signal in accordance with the variation of one said detector element impedance with respect to another said detector element impedance, said element having a plurality of input terminals and an output terminal;

alternating current biasing means coupled to said detector means for coupling a bias signal through said element through said input terminals;

load impedance means coupled to said detector means for developing a signal in accordance with the variation of one said detector element impedance with respect to said load impedance;

secondary alternating current biasing means coupled to said element and said load means for coupling a secondary bias signal current through said load means and said element through all of said terminals; and output means coupled to said detector and load means for providing an output signal in accordance with a selected characteristic of said radiation.

15. Sensing apparatus, comprising:

radiation responsive, variable impedance detector means having a detector element adapted to vary in impedance in response to said radiation for producing a signal in accordance with the variation of one said detector element impedance with respect to another said detector element impedance, said element having a plurality of input terminals and an output terminal;

alternating current biasing means coupled to said detector means for coupling an alternating current bias signal through said element through said input terminals;

load impedance means coupled to said detector means for developing a signal in accordance with the variation of one said detector element impedance with respect to said load impedance;

direct current biasing means coupled to said element and said load means for coupling a direct current bias signal current through said load means and said element through all of said terminals; and output means coupled to said detector and load means for providing an output signal in accordance with a selected characteristic of said radiation.

16. Sensing apparatus, comprising:

radiation responsive, variable impedance detector means having an element adapted to vary in impedance in response to said radiation for continuously producing a position signal indicative of the position of said radiation relative to said element and in accordance with the variation of an internal element impedance with respect to another internal element impedance;

load impedance means coupled to said detector means for continuously developing an intensity signal, independently of said position signal, in accordance with the variation of the total impedance of said element with respect to said load impedance and indicative of the intensity of said radiation; and output means coupled to said detector and load means for providing an output signal in accordance with selected characteristics of said radiation.

17. Sensing apparatus, comprising:

radiation responsive, variable impedance detector means having an element adapted to vary in impedance in response to said radiation for continuously producing an alternating current position signal indicative of the position of said radiation relative to said element and varying in phase and amplitude in accordance with the variation of an internal element impedance with respect to another internal element impedance;

load impedance means coupled to said detector means for continuously developing an intensity signal, independently of said position signal, varying in amplitude in accordance with the variation of the total impedance of said element with respect to said load impedance and indicative of the intensity of said radiation; and output means coupled to said detector and load means for providing an output signal in accordance with selected characteristics of said radiation.

18. Sensing apparatus, comprising:

radiation responsive, variable bilateral impedance detector means having an element adapted to vary in bilateral impedance in response to said radiation for continuously producing a position signal indicative of the position of said radiation relative to said element and in accordance with the variation of an internal element impedance with respect to another internal element impedance;

load impedance means coupled to said detector means in nonrectifying junction with said element for continuously developing an intensity signal, independently of said position signal, in accordance with the variation of the total impedance of said element with respect to said load impedance and indicative of the intensity of said radiation; and output means coupled to said detector and load means for providing an output signal in accordance with selected characteristics of said radiation.

19. Sensing apparatus, comprising:

radiation responsive, variable impedance detector means having an element adapted to vary in impedance in response to said radiation for continuously producing a position signal indicative of the position of said radiation relative to said element and in accordance with the variation of an internal element impedance with respect to another internal element impedance;

bias means coupled to said detector means for producing substantially an uniformly rotating field in said element;

load impedance means coupled to said detector and bias means for continuously developing an intensity signal, independently of said position signal, in accordance with the variation of the total impedance of said element with respect to said load impedance and indicative of the intensity of said radiation; and output means coupled to said detector and load means for providing an output signal in accordance with selected characteristics of said radiation.

20. Sensing apparatus, comprising:

radiation responsive, variable impedance detector means having an element adapted to vary in impedance in response to said radiation for continuously producing a position signal indicative of the position of said radiation relative to said element and in accordance with the variation of an internal element impedance with respect to another internal element impedance;

bias means coupled to said detector means for producing substantially an uniformly rotating electric field in said element;

load impedance means coupled to said detector and bias means for continuously developing an intensity signal, independently of said position signal, in accordance with the variation of the total impedance of said element with respect to said load impedance and indicative of the intensity of said radiation; and output means coupled to said detector and load means for providing an output signal in accordance with selected characteristics of said radiation.

21. Sensing apparatus, comprising:

radiation responsive, variable impedance detector means having an element adapted to vary in impedance in response to said radiation for continuously producing a position signal indicative of the position of said radiation relative to said element and in accordance with the variation of an internal element impedance with respect to another internal element impedance, said element having a plurality of input bias electrodes and a centrally disposed output electrode;

bias means coupled to said detector means through said input electrodes for producing substantially an uniformly rotating electric field in said element, the voltages, relative said output electrode, on adjacent input electrodes being in phase quadrature and the voltages, relative said output electrode, on opposing electrodes being in phase opposition;

load impedance means coupled to said detector and bias means for continuously developing an intensity signal, independently of said position signal, in accordance with the variation of the total impedance of said element with respect to said load impedance and indicative of the intensity of said radiation; and output means coupled to said detector and load means for providing an output signal in accordance with selected characteristics of said radiation.

22. Sensing apparatus, comprising:

radiation responsive, variable bilateral impedance detector means having an element adapted to vary in bilateral impedance in response to said radiation for continuously producing a position signal indicative of the position of said radiation to said element and in accordance with the variation of an internal element impedance with respect to another internal element impedance;

bias means coupled to said detector means for producing substantially an uniformly rotating electric field in said element;

load impedance means coupled to said detector and bias means in nonrectifying junction with said element for continuously developing an intensity signal, independently of said position signal, in accordance with the variation of the total impedance of said element with respect to said load impedance and indicative of the intensity of said radiation; and output means coupled to said detector and load means for providing an output signal in accordance with selected characteristics of said radiation.

23. Sensing apparatus, comprising:

radiation responsive, variable impedance detector means having an element adapted to vary in impedance in response to said radiation for producing a position signal indicative of the position of said radiation relative to said element and in accordance with the variation of an internal element impedance with respect to another internal element impedance;

load impedance means coupled to said detector means for developing an intensity signal, independently of said position signal, in accordance with the variation of the total impedance of said element with respect to said load impedance and indicative of the intensity of said radiation;

output position means coupled to said detector and load means for producing an output position signal in accordance with the first said position signal; and output intensity means coupled to said detector and load means for producing an independent output intensity signal in accordance with the first said intensity signal.

24. Sensing apparatus, comprising:

radiation responsive, variable impedance detector means;

primary biasing means coupled to said detector means for coupling a primary bias signal through said detector means;

secondary biasing means coupled to said detector means for coupling a secondary bias signal through said detector means;

primary output means coupled to said detector means for providing a primary output signal derived from variations in said primary bias signal in accordance with a primary selected characteristic of said radiation; and secondary output means coupled to said detector means for providing a secondary output signal derived from variations in said secondary bias signal in accordance with a secondary selected characteristic of said radiation.

25. The sensing apparatus of claim 24, wherein:

load impedance means are coupled to said detector means and said secondary biasing means are coupled to said detector, primary biasing and load impedance means for coupling said biasing and load impedance means.

26. Sensing apparatus, comprising:

radiation responsive, variable impedance detector means having a detector element adapted to vary in impedance in response to said radiation for producing a primary signal derived from the variation of one said detector element impedance with respect to another said detector element impedance;

biasing means coupled to said detector means for coupling a bias signal through said element;

external load impedance means coupled to said detector means and said biasing means;

primary output means coupled to said detector and load means for providing a primary output signal derived from variations in said bias signal produced by variations of said one detector element impedance with respect to said another detector element impedance in accordance with a primary selected characteristic of said radiation; and secondary output means coupled to said detector and load means for providing an output signal derived from variations in said bias signal produced by the variation of the total said detector element impedance with respect to said external load impedance in accordance with a secondary selected characteristic of said radiation.

* * * * *

UNITED STATES PATENT OFFICE
CERTIFICATE OF CORRECTION

Patent No. 3,891,843          Dated June 24, 1975

Inventor(s) William J. Parkin

It is certified that error appears in the above-identified patent and that said Letters Patent are hereby corrected as shown below:

Column 21, line 43, after "terminal" insert
-- secondary alternating current bias signal transformer --.

Signed and Sealed this

Sixth Day of July 1976

[SEAL]

*Attest:*

RUTH C. MASON
*Attesting Officer*

C. MARSHALL DANN
*Commissioner of Patents and Trademarks*